US008081685B2

United States Patent
Okamoto et al.

(10) Patent No.: US 8,081,685 B2
(45) Date of Patent: Dec. 20, 2011

(54) COMMUNICATION CONTROL APPARATUS, COMMUNICATION TERMINAL APPARATUS, WIRELESS COMMUNICATION SYSTEM, AND TRANSMITTING METHOD

(75) Inventors: Naoki Okamoto, Chiba (JP); Takashi Onodera, Yotsukaido (JP)

(73) Assignee: Sharp Kabushiki Kaisha, Osaka (JP)

( * ) Notice: Subject to any disclaimer, the term of this patent is extended or adjusted under 35 U.S.C. 154(b) by 939 days.

(21) Appl. No.: 11/990,633

(22) PCT Filed: Aug. 24, 2006

(86) PCT No.: PCT/JP2006/316640
§ 371 (c)(1),
(2), (4) Date: Feb. 19, 2008

(87) PCT Pub. No.: WO2007/023913
PCT Pub. Date: Mar. 1, 2007

(65) Prior Publication Data
US 2009/0147867 A1    Jun. 11, 2009

(30) Foreign Application Priority Data

Aug. 26, 2005    (JP) ................. 2005-246476

(51) Int. Cl.
*H04L 27/00* (2006.01)
(52) U.S. Cl. ............................................ 375/259
(58) Field of Classification Search .................. 375/258, 375/259, 260, 285, 299, 343, 346, 347, 348, 375/356; 370/203, 204, 208, 210, 281, 310, 370/480
See application file for complete search history.

(56) References Cited

U.S. PATENT DOCUMENTS 7,480,235 B2 * 1/2009 Fujii et al. ............... 370/208
2001/0021639 A1 * 9/2001 Kaku ..................... 455/41
2003/0147358 A1 * 8/2003 Hiramatsu et al. .......... 370/281
2004/0160987 A1 * 8/2004 Sudo et al. ............... 370/480
2004/0184550 A1 * 9/2004 Yoshida et al. ............ 375/260
2005/0073971 A1    4/2005 Mukai (Continued)

FOREIGN PATENT DOCUMENTS

JP    2001-69110 A    3/2001

(Continued)

OTHER PUBLICATIONS

Tokusho Suzuki et al., 2002 Nen The Institute of Electronics, Information and Communication Engineers Sogo Taikai Koen Ronbunshu, Mar. 7, 2002, Communication 1, p. 634.

(Continued)

*Primary Examiner* — David C. Payne
*Assistant Examiner* — Syed Haider
(74) *Attorney, Agent, or Firm* — Birch, Stewart, Kolasch & Birch, LLP

(57) ABSTRACT

To determine a length of a guard interval based on performance provided in a communication terminal apparatus. A communication control apparatus 100 is a communication control apparatus that adds a guard interval to transmit a symbol to a communication terminal apparatus, and is provided with a terminal information receiving section 120 that receives delayed version tolerant performance information indicating performance of a communication terminal apparatus 200 to support delayed versions from the communication terminal apparatus, a guard interval length determining section (GI length determining section) 140 that determines a length of the guard interval based on the delayed version tolerant performance information, and a data symbol transmitting section 150 that transmits the symbol with the guard interval of the determined length added thereto to the communication terminal apparatus 200.

13 Claims, 13 Drawing Sheets

U.S. PATENT DOCUMENTS

| | | | |
|---|---|---|---|
| 2005/0099936 A1* | 5/2005 | Fujii et al. | 370/203 |
| 2005/0128966 A1* | 6/2005 | Yee | 370/310 |
| 2005/0237918 A1* | 10/2005 | Asai et al. | 370/203 |
| 2006/0029143 A1* | 2/2006 | Yoshida | 375/260 |
| 2006/0062140 A1* | 3/2006 | Sudo | 370/203 |
| 2006/0250935 A1* | 11/2006 | Hamamoto et al. | 370/203 |

FOREIGN PATENT DOCUMENTS

| | | |
|---|---|---|
| JP | 2003-143654 A | 5/2003 |
| JP | 2005-110014 A | 4/2005 |
| JP | 2005-303826 A | 10/2005 |
| JP | 2006-180321 A | 7/2006 |

OTHER PUBLICATIONS

Tokusho Suzuki et al., 2002 Nen IEICE Communications Society Conference Koen Ronbunshu 1, Aug. 20, 2002, p. 320.

Kenkichi Hirade et al., IEICE, Technical Report, RCS98-126, Oct. 1998, pp. 45-52.

* cited by examiner

| OPERATION CLASS | DELAYED VERSION TOLERANT PERFORMANCE | POWER CONSUMPTION |
|---|---|---|
| A | 10μs | 5.0mW |
| B | 7μs | 4.0mW |
| C | 5μs | 3.5mW |
| D | 3μs | 3.0mW |

FIG. 10

COMMUNICATION CONTROL APPARATUS, COMMUNICATION TERMINAL APPARATUS, WIRELESS COMMUNICATION SYSTEM, AND TRANSMITTING METHOD

TECHNICAL FIELD

The present invention relates to an adjustment of a length of a guard interval in wireless communication where communications are performed with the guard interval added to a symbol.

BACKGROUND ART

Conventionally, OFDM (Orthogonal Frequency Division Multiplexing) systems have been known as schemes having a tolerance to frequency selective fading, because communicated information is divided into a plurality of subcarriers, and the signals are orthogonal to one another. Further, a guard interval (hereinafter, "guard interval" is also referred to as "GI") is provided to eliminate the effect of the preceding symbol due to the delayed versions. As the length of a guard interval is longer, the tolerance to delayed versions with long delay time is higher, while the rate enabling transmission of information is lower.

For example, for a data symbol of 50 μs, when the guard interval is 5 μs (microseconds), the effective rate is 50/55, and when the guard interval is 10 μs, the effective rate is 50/60, resulting in a reduction in throughput of communication. In other words, in systems such as the OFDM system and the like requiring the guard interval, when the guard interval is set at a length of a delayed version with the longest delay difference time, it is possible to perform communications without interference from delayed versions and waste time. FIGS. 11 and 12 show an example of the relationship between delayed versions and guard interval. FIG. 11 shows the case where multipath delay is smaller than GI, and FIG. 12 shows the case where multipath delay is larger than GI. In FIGS. 11 and 12, a frame configuration in transmission is shown on the top, and frame configurations in reception are shown below. The diagonally right up shaded areas shown in portions under the frames indicate ranges enabling division of signals without problems, and the diagonally right down shaded areas indicate portions where the signal deteriorates due to interference from the preceding data. When multipath delay is larger than GI, the symbol (signal) degrades due to interference from the preceding data.

Further, the relationship between the GI length, interference and transmission rate is as follows:
(1) When GI length>maximum delay, it is possible to avoid interference, but the transmission rate decreases;
(2) When GI length=maximum delay, it is possible to avoid interference, and the communication rate is good; and
(3) When GI length<maximum delay, deterioration due to interference occurs, but the transmission rate increases. Accordingly, it is desired to adjust the GI length so as to balance avoidance of interference and the transmission rate.

Patent Document 1 discloses an example of the communication system for adjusting the GI length. FIG. 13 is an example of a block diagram illustrating a configuration of an OFDM communication apparatus disclosed in Patent Document 1. In Patent Document 1, the guard interval length that is a key of efficiency of communication is configured to be variable and controllable. According to the abstract of Patent Document 1, following operations are disclosed.

A measurement symbol transmitting section 22 transmits a series of measurement symbols sequentially. A measurement symbol receiving section 23 sequentially receives the measurement symbols transmitted through a communication channel 21, and detects the shortest guard interval κ that can be identified. A notification transmitting section 25 notifies κ to a notification receiving section 26. The notification receiving section 26 outputs the notified κ to a data symbol transmitting section 30. Using the guard interval length κ, the data symbol transmitting section 30 generates a data symbol ω of OFDM from input transmission data X to transmit. Using the guard interval length κ, a data symbol receiving section 31 receives the transmitted OFDM data symbol ω, and outputs the reception data Y (citation from the abstract of Patent Document 1).

Patent Document 1: Japanese Laid-Open Patent Publication No. 2001-69110
Patent Document 2: Japanese Laid-Open Patent Publication No. 2003-143654
Non-patent Document 1: Kenkichi Hirade, Hiroshi Suzuki, Kazuhiko Fukawa, "RLS-MLSE for mobile radio communications", IEICE, Technical Report, RCS98-126, p. 45-52, October, 1998

DISCLOSURE OF INVENTION

Problems to be Solved by the Invention

However, in the conventional example as disclosed in Patent Document 1, it is necessary to send a plurality of guard measurement symbols with different guard intervals each time to measure, resulting in extra overhead. For example, to send seven guard intervals of from 3 μS to 10 μS, measurement symbol transmission is required corresponding to such a number, and when terminals having small delay to large delay exist, the required number is high. Further, in the conventional example, when the measurement symbol is not received actually, the symbol is eliminated as the effect of a delayed version exceeding the guard interval, but also when the noise is high accidentally in reception without the problem of delayed versions, the symbol cannot be received sometimes, and a single exchange is incomplete.

The present invention is carried out in view of the aforementioned circumstances, and it is an object of the invention to provide a communication control apparatus, wireless communication system and transmitting method for determining a length of a guard interval based on performance provided in a communication terminal apparatus.

Means for Solving the Problem (1) An aspect of a communication control apparatus according to the invention is a communication control apparatus that adds a guard interval to transmit a symbol to a communication terminal apparatus, and is characterized by having a receiving section that receives delayed version tolerant performance information indicating performance supported by the communication terminal apparatus on delayed versions, a guard interval length determining section that determines a length of the guard interval based on the delayed version tolerant performance information, and a transmitting section that transmits the symbol with the guard interval of the determined length added thereto to the communication terminal apparatus.

Thus, according to one aspect of the communication control apparatus according to the invention, the communication control apparatus is capable of determining the guard interval length based on the terminal performance information (delayed version tolerant performance information) provided in the communication terminal apparatus. It is thereby possible to determine the guard interval length corresponding to the performance of the communication terminal apparatus. It is further possible to improve transmission efficiency of the propagation path.

(2) In one aspect of the communication control apparatus according to the invention, it is another feature that the receiving section further receives propagation path information indicating delay conditions of a propagation path, and that the guard interval length determining section determines the length of the guard interval based on the delayed version tolerant performance information and the propagation path information.

Thus, one aspect of the communication control apparatus enables the guard interval length to be determined based on the delayed version tolerant performance information and the propagation path information. It is thus possible to determine the guard interval length corresponding to two factors which are the delayed version tolerant performance information provided in the terminal and the propagation path information.

(3) In one aspect of the communication control apparatus according to the invention, it is another feature to further have a terminal performance storing section that stores the delayed version tolerant performance information, where the guard interval length determining section determines the guard interval length based on the delayed version tolerant performance information stored in the terminal performance storing section, and the propagation path information received in the receiving section.

Thus, one aspect of the communication control apparatus enables the delayed version tolerant performance information to be stored in the terminal performance storing section in the communication control apparatus. By this means, the communication terminal apparatus eliminates the need to notify the delayed version tolerant performance information in second and subsequent communications, and is capable of suppressing transmission amounts.

(4) In one aspect of the communication control apparatus according to the invention, it is another feature to further have a modulation parameter selecting section that selects a modulation parameter using reception sensitivity performance information that associates each of a plurality of modulation parameters for specifying at least one of a modulation scheme and a coding rate with two factors which are reception quality information indicating quality of a received signal and delay information indicating delay conditions of the signal, where the receiving section further receives the reception quality information, the propagation path information indicating delay conditions of the propagation path, and the reception sensitivity performance information, the guard interval length determining section determines the length of the guard interval based on the delayed version tolerant performance information and the propagation path information, the modulation parameter selecting section selects the modulation parameter by searching the received reception sensitivity performance information based on the received reception quality information and propagation path information, and the transmitting section adds the guard interval of the determined length to the symbol modulated with the selected modulation parameter to transmit to the communication terminal apparatus.

Thus, one aspect of the communication control apparatus is capable of determining the optimal guard interval length corresponding to the propagation path environment (propagation path conditions) and the performance of the communication terminal apparatus. It is thereby possible to improve transmission efficiency of the propagation path.

(5) In one aspect of the communication control apparatus according to the invention, provided further is a terminal performance storing section that stores the delayed version tolerant performance information and the reception sensitivity performance information, and in one aspect of the communication control apparatus according to the invention, it is another feature that the guard interval length determining section determines the guard interval length based on the delayed version tolerant performance information stored in the terminal performance storing section, and the propagation path information received in the receiving section, and that the modulation parameter selecting section selects the modulation parameter by searching the reception sensitivity performance information stored in the terminal performance storing section, based on the received reception quality information and propagation path information.

Thus, one aspect of the communication control apparatus enables the delayed version tolerant performance information and the reception sensitivity performance information to be stored in the storing section in the communication control apparatus. By this means, the communication terminal apparatus eliminates the need to notify the delayed version tolerant performance information and reception sensitivity performance information in second and subsequent communications, and is capable of suppressing transmission amounts.

(6) In one aspect of the communication control apparatus according to the invention, it is another feature that the receiving section receives a delay profile measured by the communication terminal apparatus as the propagation path information, and that the guard interval length determining section determines the length of the guard interval for compensating delay conditions, based on the delayed version tolerant performance information and the delay profile.

Thus, one aspect of the communication control apparatus is capable of determining the guard interval length based on the delayed version tolerant performance information and the delay profile. It is thereby possible to determine the guard interval length in consideration of delayed versions indicated in the delay profile measured by the communication terminal apparatus.

(7) In one aspect of the communication control apparatus according to the invention, it is another feature that the receiving section further receives mobile speed information of the communication terminal apparatus, and that the modulation parameter selecting section selects the modulation parameter by searching the reception sensitivity performance information, based on the received mobile speed information, in addition to the reception quality information and the propagation path information.

Thus, one aspect of the communication control apparatus enables the modulation parameter to be selected based on the mobile speed information of the communication terminal apparatus.

(8) In one aspect of the communication control apparatus according to the invention, it is another feature that the receiving section further receives an operation class indicating status where the communication terminal apparatus uses the delayed version tolerant performance, and that the modulation parameter selecting section selects the modulation parameter by searching the reception sensitivity performance information further based on the received operation class.

Thus, one aspect of the communication control apparatus enables the modulation parameter to be selected based on the operation class. It is thereby possible to select the modulation parameter corresponding to the operating status of the communication terminal apparatus.

(9) In one aspect of the communication control apparatus according to the invention, it is another feature that the receiving section further receives an operation class indicating status where the communication terminal apparatus uses the delayed version tolerant performance, and that the guard interval length determining section determines the guard interval length based on the delayed version tolerant performance information, the propagation path information and the received operation mode.

Thus, one aspect of the communication control apparatus enables the guard interval length to be determined based on the operation class. It is thereby possible to determine the guard interval length corresponding to the operating status of the communication terminal apparatus.

(10) In one aspect of the communication control apparatus according to the invention, it is another feature that the operation class includes iterations of a turbo equalizer.

Thus, one aspect of the communication control apparatus is capable of determining the guard interval length and selecting a modulation parameter corresponding to the operating status of the turbo equalizer.

(11) In one aspect of the communication control apparatus according to the invention, it is another feature that the guard interval length determining section determines the guard interval length based on a transmission capacity required for the communication control apparatus, in addition to the delayed version tolerant performance information and the propagation path information.

Thus, one aspect of the communication control apparatus enables the guard interval length to be determined based on the traffic status.

(12) An aspect of a wireless communication system according to the invention is a wireless communication system where a communication control apparatus adds a guard interval to transmit a symbol to a communication terminal apparatus, and is characterized in that the communication terminal apparatus has a delayed version tolerant performance table that stores delayed version tolerant performance information indicating performance supported by the communication terminal apparatus on delayed versions, a terminal-side transmitting section that transmits the delayed version tolerant performance information, and a terminal-side receiving section that receives the symbol from the communication control apparatus, and that the communication control apparatus has a control-side receiving section that receives the delayed version tolerant performance information from the communication terminal apparatus, a guard interval length determining section that determines a length of the guard interval based on the delayed version tolerant performance information, and a control-side transmitting section that transmits the symbol with the guard interval of the determined length added thereto to the communication terminal apparatus.

Thus, according to one aspect of the wireless communication system according to the invention, the communication control apparatus is capable of determining the guard interval length based on the terminal performance information (delayed version tolerant performance information) provided in the communication terminal apparatus. It is thereby possible to determine the guard interval length corresponding to the performance of the communication terminal apparatus. It is further possible to improve transmission efficiency of the propagation path. Moreover, since the guard interval length is determined on the communication control apparatus side, it is possible to reduce the processing load on the communication terminal apparatus side.

(13) A transmitting method according to the invention is a transmitting method for adding a guard interval to transmit a symbol to a communication terminal apparatus, and is characterized by receiving delayed version tolerant performance information indicating performance supported by the communication terminal apparatus on delayed versions, determining a length of the guard interval based on the delayed version tolerant performance information, and transmitting the symbol with the guard interval of the determined length added thereto to the communication terminal apparatus.

Thus, according to one aspect of the transmitting method according to the invention, it is possible to determine the guard interval length, based on the terminal performance information (delayed version tolerant performance information) provided in the communication terminal apparatus. It is thereby possible to determine the guard interval length corresponding to the performance of the communication terminal apparatus. It is further possible to improve transmission efficiency of the propagation path.

(14) An aspect of a transmitting method according to the invention is a transmitting method where a communication control apparatus adds a guard interval to transmit a symbol to a communication terminal apparatus, and is characterized in that the communication terminal apparatus stores delayed version tolerant performance information indicating performance supported by the communication terminal apparatus on delayed versions in a delayed version tolerant performance table, transmits the delayed version tolerant performance information, and receives the symbol from the communication control apparatus, and that the communication control apparatus receives the delayed version tolerant performance information from the communication terminal apparatus, determines a length of the guard interval based on the delayed version tolerant performance information, and transmits the symbol with the guard interval of the determined length added thereto to the communication terminal apparatus.

Thus, according to one aspect of the transmitting method according to the invention, it is possible to determine the guard interval length based on the terminal performance information (delayed version tolerant performance information) provided in the communication terminal apparatus. It is thereby possible to determine the guard interval length corresponding to the performance of the communication terminal apparatus. It is further possible to improve transmission efficiency of the propagation path. Moreover, since the guard interval length is determined on the communication control apparatus side, it is possible to reduce the processing load on the communication terminal apparatus side.

Advantageous Effect of the Invention

According to the invention, a communication control apparatus is capable of determining a length of a guard interval based on performance provided in a communication terminal apparatus.

BRIEF DESCRIPTION OF DRAWINGS

FIG. 10 is a diagram showing an example of an operation class;

Figure 1:
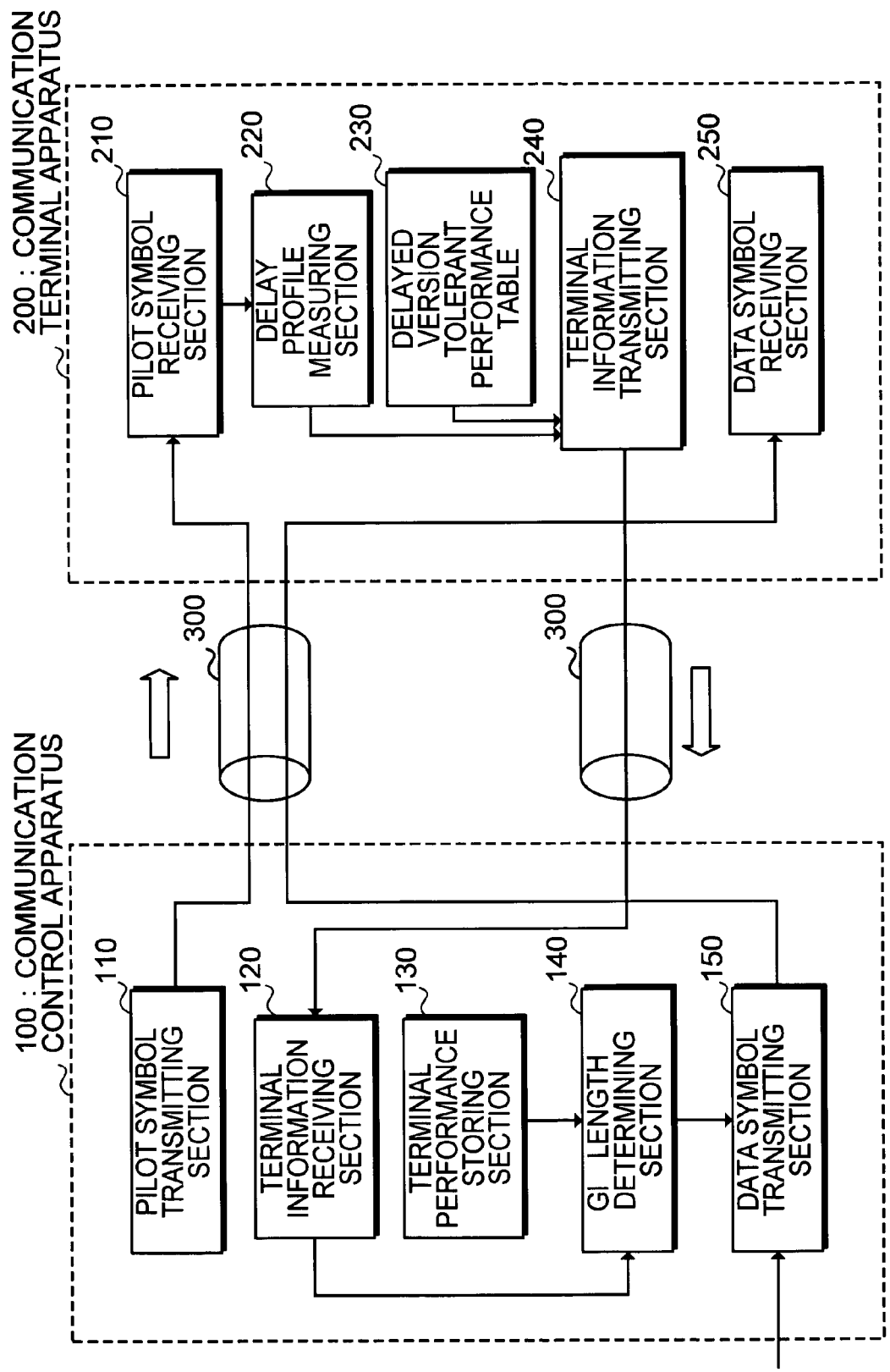
FIG. 1 is a block diagram showing an example of a configuration of a wireless communication system of the first embodiment.

DESCRIPTION OF SYMBOLS 100, 400 communication control apparatus
110 pilot symbol transmitting section
120, 420 terminal information receiving section
130, 430 terminal performance storing section
140 guard interval length determining section (GI length determining section)
150, 450 data symbol transmitting section
460 modulation parameter selecting section
200, 500 communication terminal apparatus
210 pilot symbol receiving section
220 delay profile measuring section
230 delayed version tolerant performance table
240, 540 terminal information transmitting section
250, 550 data symbol receiving section
300 communication channel
560 reception signal quality measuring section
570 reception sensitivity performance table

BEST MODE FOR CARRYING OUT THE INVENTION

First Embodiment

The first embodiment describes an aspect where a communication control apparatus determines the length of a guard interval (guard interval length) using delayed version tolerant performance.

FIG. 1 is a block diagram showing an example of a configuration of a wireless communication system of the first embodiment. The wireless communication system as shown in FIG. 1 shows an example of comprised of a communication control apparatus 100 that transmits data symbols, a communication terminal apparatus 200 that receives the data symbols, and a communication channel 300. Further, in this specification, as an example, descriptions are made while assuming that the communication control apparatus 100 is a base station in the wireless communication system and that the communication terminal apparatus 200 is a terminal station. Further, in the following descriptions, the communication control apparatus 100 is referred to as the base station, and the communication terminal apparatus 200 is referred to as the terminal (or terminal station), as appropriate.

The communication control apparatus 100 has a pilot symbol transmitting section 110, terminal information receiving section (receiving section, control-side receiving section) 120, terminal performance storing section 130, guard interval length determining section (GI length determining section) 140, and data symbol transmitting section (transmitting section, control-side transmitting section) 150. Meanwhile, the communication terminal apparatus 200 has a pilot symbol receiving section 210, delay profile measuring section 220, delayed version tolerant performance table 230, terminal information transmitting section (terminal-side transmitting section) 240, and data symbol receiving section (terminal-side receiving section) 250.

The configuration of the communication control apparatus 100 will be described first. The pilot symbol transmitting section 110 transmits a pilot symbol including one kind of GI to the communication terminal apparatus 200 via the communication channel 300. The terminal information receiving section 120 receives terminal information transmitted from the communication terminal apparatus 200. The terminal information is a generic term for information notified from the communication terminal apparatus 200 (terminal) to the communication control apparatus (base station) 100, and in this embodiment, includes delayed version tolerant performance information indicating the performance supported by the communication terminal apparatus 200 on delayed versions, and propagation path information (for example, delay profile) indicating delay conditions. In this embodiment, descriptions are made using the delay profile as an example of the propagation path information. The terminal performance storing section 130 is a storage area for storing the terminal performance information (delayed version tolerant performance information in this embodiment) indicating the performance provided in the terminal and an identifier (hereinafter, the identifier is referred to as a terminal ID) that identifies the communication terminal apparatus 200 in association with each other.

The delayed version tolerant performance is to indicate the degree of performance (performance for permitting reception of delayed versions) obtained in the communication terminal apparatus 200 on condition that delayed versions are present. For example, a communication terminal apparatus having an equalizer or the like notifies an effective range of the function of the equalizer on delayed versions as the delayed version tolerant performance information. Further, the delayed version tolerant performance indicates the performance provided in the terminal, and therefore, is also referred to as terminal performance.

The GI length determining section 140 determines the GI length based on the terminal information. In this embodiment, as the terminal information, based on the delayed version tolerant performance information and delay profile, the section 140 determines the GI length. The data symbol transmitting section 150 transmits a data symbol with the GI of the length determined in the GI length determining section 140 added thereto to the communication terminal apparatus 200.

The configuration of the communication terminal apparatus 200 will be described next. The pilot symbol receiving section 210 receives a pilot symbol from the communication control apparatus 100. The delay profile measuring section 230 measures a delay profile, using the propagation path information included in the pilot symbol. The delayed version tolerant performance table 230 is a storage area for storing the delayed version tolerant performance information indicating the delayed version tolerant performance provided in the apparatus 200, and beforehand stores the delayed version tolerant performance information. The terminal information transmitting section 240 transmits the terminal information to the communication control apparatus 100. The data symbol receiving section 250 receives the data symbol from the communication control apparatus 100.

Figure 2:
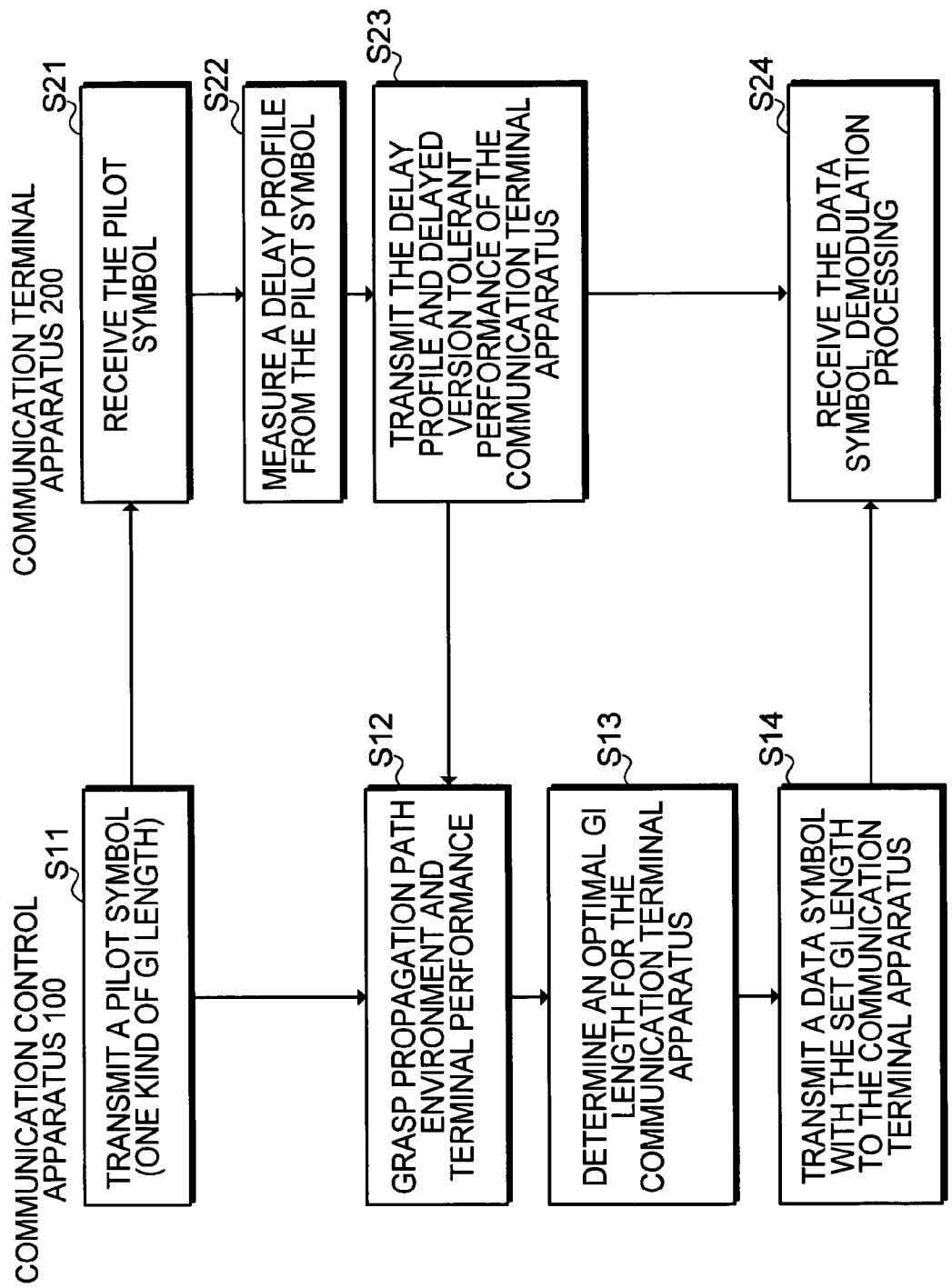
FIG. 2 is a diagram showing an example of processing of first communications associated with an adjustment of GI length in the wireless communication system of the first embodiment.

The operation of this embodiment will be described next. FIG. 2 is a diagram showing an example of processing of first communications associated with an adjustment of GI length in the wireless communication system of this embodiment.

In the communication control apparatus 100, the pilot symbol transmitting section 110 transmits a pilot symbol (step S11). One kind of GI is added to the pilot symbol, and the GI with a predetermine length is added. In the communication terminal apparatus 200, the pilot symbol receiving section 210 receives the transmitted pilot symbol (step S21), and the delay profile measuring section 220 measures a delay profile of the propagation path using the received pilot symbol (step S22). The terminal information transmitting section 240 transmits the terminal information including the measured delay profile and the delayed version tolerant performance information stored in the delayed version tolerant performance table 230 to the communication control apparatus 100 (step S23). By this means, the communication terminal apparatus 200 notifies the communication control apparatus 100 (base station) of the received propagation path environment (delay profile) and the terminal performance (delayed version tolerant performance) of the apparatus 200.

In the communication control apparatus 100, the terminal information receiving section 120 receives the terminal information, and notifies the terminal information to the GI length determining section 140, while writing the delayed version tolerant performance information included in the terminal information in the terminal performance storing section 130 in association with the terminal ID (step S12). By this means, the communication control apparatus 100 grasps the propagation path environment and terminal performance. The GI length determining section 140 determines an optimal (for example, the shortest) guard interval enabling reception in the communication terminal apparatus 200 from two kinds of information (step S13). Determination of the GI length will be described later. The data symbol transmitting section 150 transmits a data symbol with the GI of the determined length added thereto (step S14). In the communication terminal apparatus 200, the data symbol receiving section 250 receives the data symbol from the communication control apparatus 100, and performs the demodulation processing (step S24).

Figure 3:
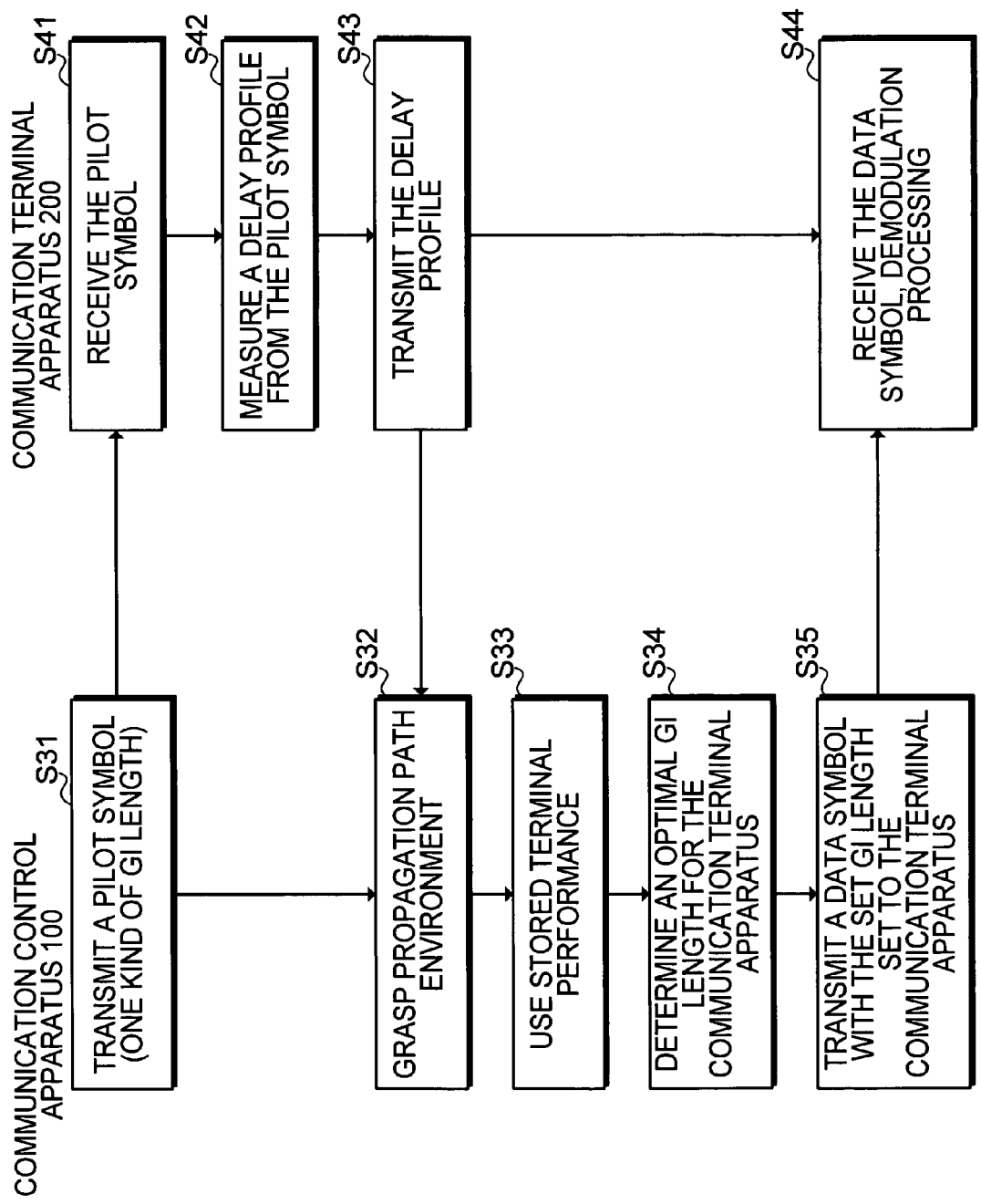
FIG. 3 is a diagram showing an example of processing of second communications associated with the adjustment of the GI length in the wireless communication system of the first embodiment.

Thus, the communication terminal apparatus 200 notifies the delayed version tolerant performance information of the apparatus 200 in the processing of first communications. In second and subsequent communications, since the terminal performance information is known (stored) for each terminal, the communication control apparatus 100 is capable of determining the optimal information to use from two kinds of information when being able to receive the propagation path information (delay profile) from the communication terminal apparatus 200. FIG. 3 is a diagram showing an example of processing of second communications associated with the adjustment of the GI length in the wireless communication system of this embodiment.

In the communication control apparatus 100, the pilot symbol transmitting section 110 transmits a pilot symbol (step S31). Also herein, one kind of GI is added to the pilot symbol, and the GI with a predetermine length is added. In the communication terminal apparatus 200, the pilot symbol receiving section 210 receives the transmitted pilot symbol (step S41), and the delay profile measuring section 220 measures a delay profile of the propagation path (step S42). The terminal information transmitting section 240 transmits the measured delay profile to the communication control apparatus 100 as the terminal information (step S43). By this means, the communication terminal apparatus 200 notifies the communication control apparatus 100 (base station) of the received propagation path environment (delay profile).

In the communication control apparatus 100, the terminal information receiving section 120 receives the delay profile as the terminal information, and notifies the terminal information to the GI length determining section 140 (step S32). The GI length determining section 140 reads the delayed version tolerant performance information from the terminal performance storing section 130 using the terminal ID for identifying the communication terminal apparatus 200 (step S33), and determines an optimal (for example, the shortest) guard interval enabling reception in the communication terminal apparatus 200 from the delayed version tolerant performance information and delay profile (step S34). The data symbol transmitting section 150 transmits a data symbol with the GI of the determined length added thereto (step S35). In the communication terminal apparatus 200, the data symbol receiving section 250 receives the data symbol from the communication control apparatus 100, and performs the demodulation processing (step S44).

Figure 4:
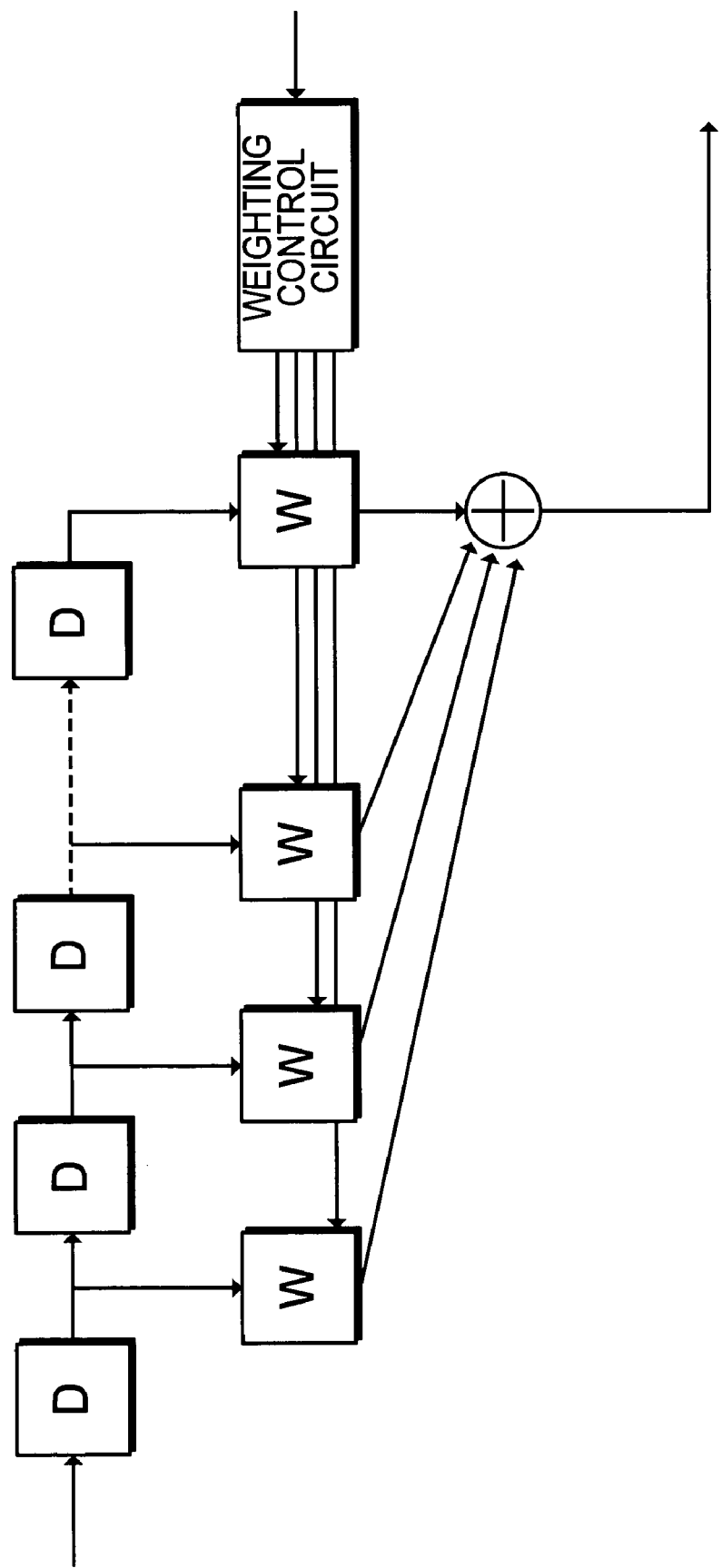
FIG. 4 is a diagram showing an example of a block diagram of a general liner equalizer.

Described herein is the delayed version tolerant performance (terminal performance). For example, FIG. 4 shows an example of a block diagram of a general liner equalizer. In this circuit scheme, delayed versions that delay elements support are in the range of the weighting processing, but the performance deteriorates sharply at the instant when a delayed version beyond support of the delay elements is input. Meanwhile, many types of equalizers are proposed (for example, Non-patent Document 1), and delay amounts to support and performance varies with the types of equalizers. Details of the equalizer are omitted herein. The performance of an equalizer varies with the type of equalizer incorporated into the communication terminal apparatus and the processing scheme, and the performance for modeled delay versions is each defined. Therefore, the delayed version tolerant performance information of the communication terminal apparatus (terminal) based on the type of equalizer and installation performance is notified to the communication control apparatus (base station), and the communication control apparatus determines the length of a GI using the delayed version tolerant performance information.

Figure 5:
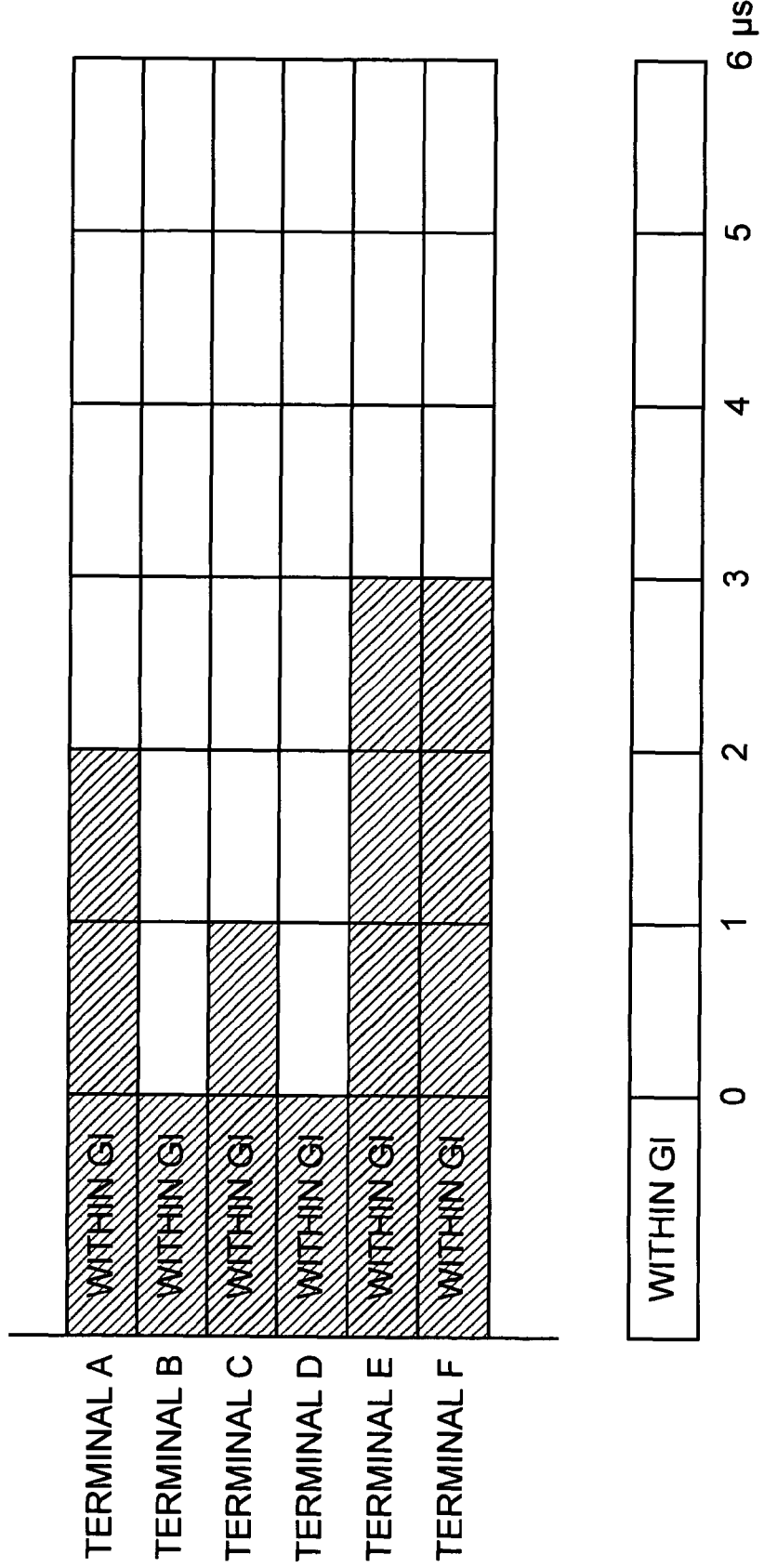
FIG. 5 is a diagram showing an example of delayed version tolerant performance for each communication terminal apparatus (terminal)

Procedures for determining the GI length will be described next. FIG. 5 is a diagram showing an example of the delayed version tolerant performance for each communication terminal apparatus (terminal). The horizontal axis represents a variable due to the delay profile, and may have a value associated with the delayed version such as delay dispersion, maximum delay, a value with both the factors taken into consideration or the like as a parameter. FIG. 5 shows the delayed version tolerant performance for each terminal in the vertical direction. Each of terminal A, terminal B, . . . , terminal F is the terminal ID. The rectangle portion describing within GI represents the length of the GI. Herein, the length of the GI is a reference length (for example, 2 μS). Further, each of subsequent rectangles to the rectangle of within GI represents 1 μS. Shaded portions represent delay compensation ranges (delay avoidance ranges) enabling compensation for delay conditions of a symbol using the GI length and the delayed version tolerant performance provided in each terminal. Accordingly, in the example of FIG. 5, the delay compensation range is comprised of portions of the GI length and the delayed version tolerant performance. For example, the portion of the delayed version tolerant performance is 2 μS in the terminal A, while being not present in the terminal B (0 μS).

For example, when the maximum delayed version of the propagation environment is 2 μS or less, all the terminals are able to receive symbols on condition that a guard interval with the reference length of 2 μS is added. Meanwhile, in the case where the maximum delayed version is 4 μS, terminals A, E and F have the tolerance exceeding the reference length of 2 μS or more, and therefore, are able to receive symbols when the symbols are transmitted with the guard interval length of 2 μS that is the reference length. Meanwhile, terminals B and D can permit only up to 2 μS that is the reference length, the terminal C is of the reference length plus 1 μS, and therefore, the terminals are not able to receive symbols. In this case, the GI length determining section 140 determines the guard interval lengths so that the communication control apparatus transmits to the terminals A, E and F with the guard interval length of 2 μS that is the reference length, to the terminals B and D with the guard interval length of 4 μS that is the reference length 2 μS plus 2 μS, and to the terminal C with the guard interval length of 3 μS.

FIG. 5 shows for each terminal the performance (delayed version tolerant characteristic) for delayed versions on a terminal basis, which is the information notified for each terminal. It is assumed that the terminal with the longer shaded portion has more excellent performance for delayed versions. Accordingly, in procedures of second and subsequent communications where the delayed version tolerant performance information of the terminal is known, when the value associated with the propagation path on the horizontal axis is specified, this table enables judgment of the extent of the guard interval required for each terminal. In addition, the extent to which the delay conditions are compensated (avoided) by the guard interval is determined by the balance between the interference range due to interfering signals and transmission efficiency (transmission rate). Accordingly, the balance varies also with the purpose of communications.

Therefore, the GI length determining section 140 determines the GI length so that delayed versions are accommodated within the delay compensation range shown by the shaded portion. Thus, the communication control apparatus 100 is capable of determining the GI length based on the delayed version tolerant performance information and the propagation path information (delay profile) indicating delay conditions.

In the conventional example as disclosed in Patent Document 1, it is necessary to make an optimal symbol setting by transmission of a plurality of measurement symbols whenever the propagation environment changes (for example, in the case of moving). In contrast thereto, in this embodiment, since the terminal information (delayed version tolerant performance information) notified from the communication terminal apparatus (terminal) can be stored in the communication control apparatus, and the processing is thereby simplified.

As described above, conventionally, since the communication terminal apparatus performance and delay profile characteristics have been collectively judged and processed, measurement symbols have been transmitted each time, and the optimal guard interval length has been determined in the same procedures. In contrast thereto, in this embodiment, the process is introduced of dividing the delayed version tolerant performance information based on the type of equalizer and its performance and the delay profile information, and obtaining on the communication control apparatus (base station) side the optimal guard interval length from two kinds of information. By this means, it is possible to decrease the length of a pilot symbol (conventionally n types, one kind in this embodiment) to be transmitted in first communications, the need for notifying the delayed version tolerant performance information is further eliminated in procedures of second and subsequent communications, resulting in the processing for notifying the propagation path information from the communication terminal apparatus, and the processing can be simplified. Further, it is possible to suppress transmission amounts of second and subsequent communications. Furthermore, in the communication terminal apparatus, the need is eliminated for performing the processing of selecting one guard interval length from a plurality of guard interval lengths. The processing load is thereby reduced on the communication terminal apparatus side.

Thus, in this embodiment, it is possible to determine a guard interval length optimal for the propagation path environment (delay conditions) and the performance of the communication terminal apparatus. It is thereby possible to improve usage efficiency of the propagation path. Further, in the communication terminal apparatus, it is not necessary to perform the processing of selecting one guard interval length from a plurality of guard interval lengths. The processing load is thereby reduced on the communication terminal apparatus side.

In addition, as the means for obtaining delay characteristics (delayed versions), this embodiment shows the method of obtaining from a pilot symbol in the communication terminal apparatus, but any other methods may be adopted which enable measurement of the delay characteristics between the communication control apparatus and communication terminal apparatus. Further, this embodiment uses the delay profile as the propagation path information to explain, but the propagation path information is not limited to the delay profile, and any information other than the delay profile may be used as long as the information is the propagation path information enabling delay conditions to be judged. For example, as the method of obtaining the delay characteristics, there are methods for transmitting a signal different from a data symbol to obtain, and for obtaining impulse response by impulse. Further, as the propagation path information, it is possible to use as a reference a maximum delayed version (for example, 10 dB up of noise level) exceeding the reference level causing the interference problem or the like, as well as the delay profile.

Second Embodiment

The second embodiment describes an aspect where the communication control apparatus uses the delayed version tolerant performance as one parameter, and the terminal performance in reception SIR (Signal-to-Interference power ratio) as another parameter, and determines an optimal guard interval length and modulation parameter from two environment parameters associated with the communication terminal apparatus, i.e. from the reception quality (SIR) and propagation delay.

Figure 6:
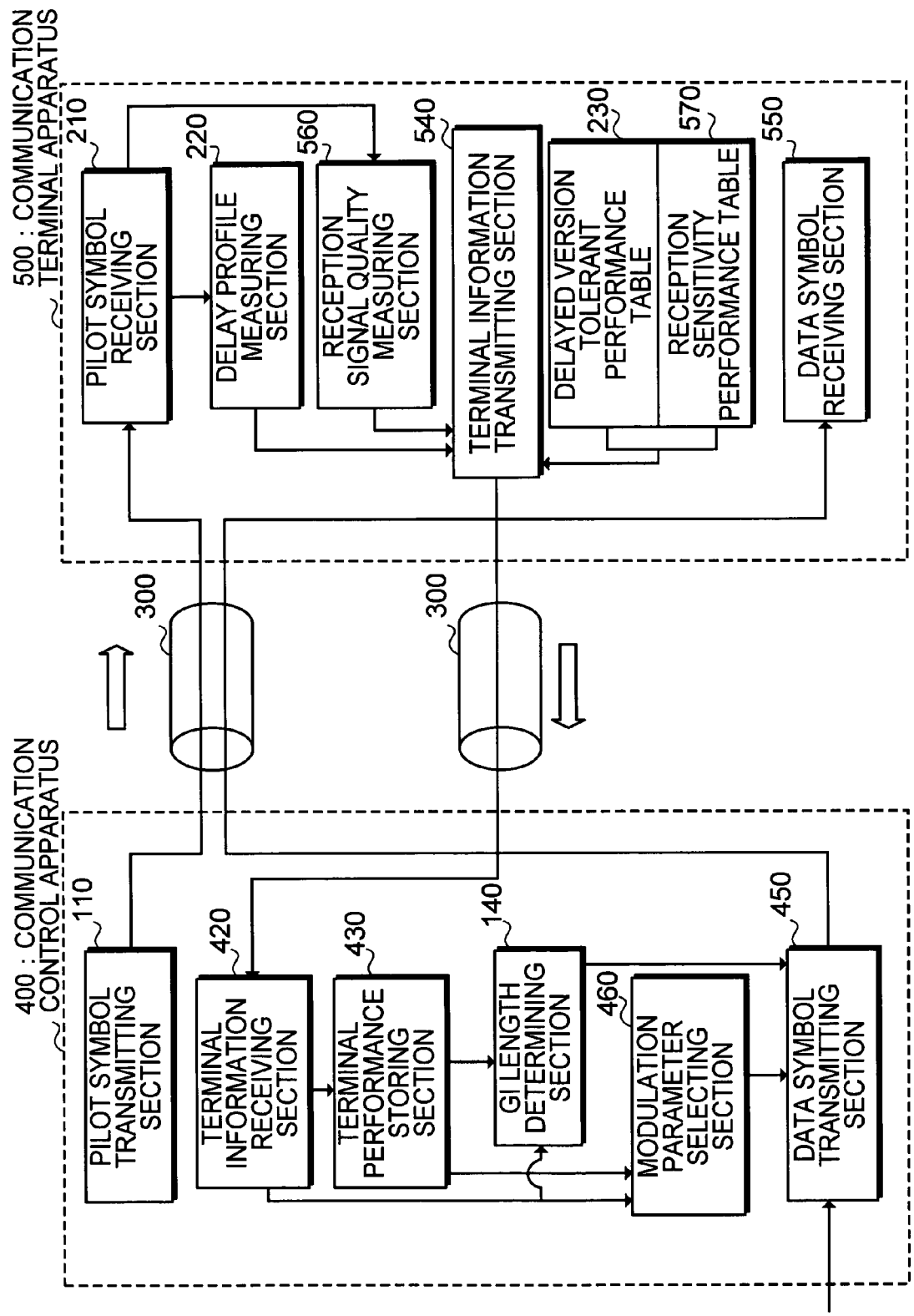
FIG. 6 is a block diagram showing an example of a configuration of a wireless communication system of the second embodiment.

FIG. 6 is a block diagram showing an example of a configuration of a wireless communication system of the second embodiment. The wireless communication system as shown in FIG. 6 shows a configuration example where a communication control apparatus 400 and a communication terminal apparatus 500 perform wireless communication with each other via the communication channel 300. In addition to the configuration in the first embodiment, a modulation parameter selecting section 460 is added to the communication control apparatus 400, and a reception signal quality measuring section 560 and reception sensitivity performance table 570 are added to the communication terminal apparatus 500.

The communication control apparatus 400 differs from the communication control apparatus 100 as shown in FIG. 1 in the following respects. The terminal information receiving section 420 receives as the terminal information the information including the reception quality information and reception sensitivity performance information, in addition to the delayed version tolerant performance information and propagation path information (for example, delay profile). The terminal performance storing section 430 is a storage area for storing the delayed version tolerant performance information and reception sensitivity performance information, as the terminal performance information, in association with the terminal ID, for each terminal.

Herein, the reception quality information is information indicating the quality of a signal received in the communication terminal apparatus 500, and for example, reception SIR is used. The reception sensitivity performance information is information of a plurality of modulation parameters to be specified based on the terminal performance information. Further, the terminal performance information includes the reception quality information and delay information indicating delay conditions of a signal. Furthermore, the modulation parameter is a parameter to specify at least one of a modulation scheme and coding rate (coding scheme), and more specifically, the modulation scheme, coding rate or a combination thereof.

Based on the terminal information, the modulation parameter selecting section 460 selects one from a plurality of modulation parameters stored in the terminal performance storing section 430. The data symbol transmitting section 450 transmits a data symbol, which is modulated using the selected modulation parameter and given the GI with the length determined in the GI length determining section 140, to the communication terminal apparatus 200.

Figure 7:
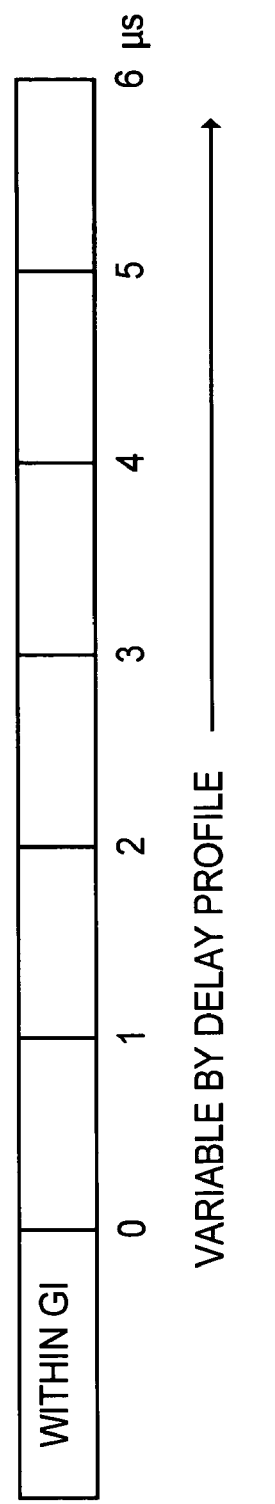
FIG. 7 is a diagram showing an example of a two-dimensional table of reception sensitivity performance information.

Next, the communication terminal apparatus 500 differs from the communication terminal apparatus 200 as shown in FIG. 1 in the following respects. The terminal information transmitting section 540 transmits as the terminal information the delayed version tolerant performance, propagation path information, reception quality information and reception sensitivity performance information to the communication control apparatus 400. The data symbol receiving section 550 receives a data symbol from the communication control apparatus 400 to demodulate. The reception signal quality measuring section 560 measures the reception quality using a pilot symbol. The reception sensitivity performance table 570 is a storage area for storing the reception sensitivity performance information. The reception sensitivity performance information is a set of a plurality of modulation parameters to be specified by the reception quality information and delay information (variable by delay profile), and the plurality of modulation parameters is stored as the reception sensitivity performance information represented by a two-dimensional table with the reception quality information and delay information as variables. Accordingly, the reception sensitivity performance information is a table for associating the plurality of modulation parameters with two factors which are the reception quality information and delay information. FIG. 7 shows an example of the twodimensional table of the reception sensitivity performance information. In FIG. 7, the reception sensitivity performance provided in the terminal A is shown as an example. The horizontal axis represents a variable by delay profile that is the same variable by delay profile described in FIG. 5. On the vertical axis, the reception quality (SIR) is a variable.

Figure 8:
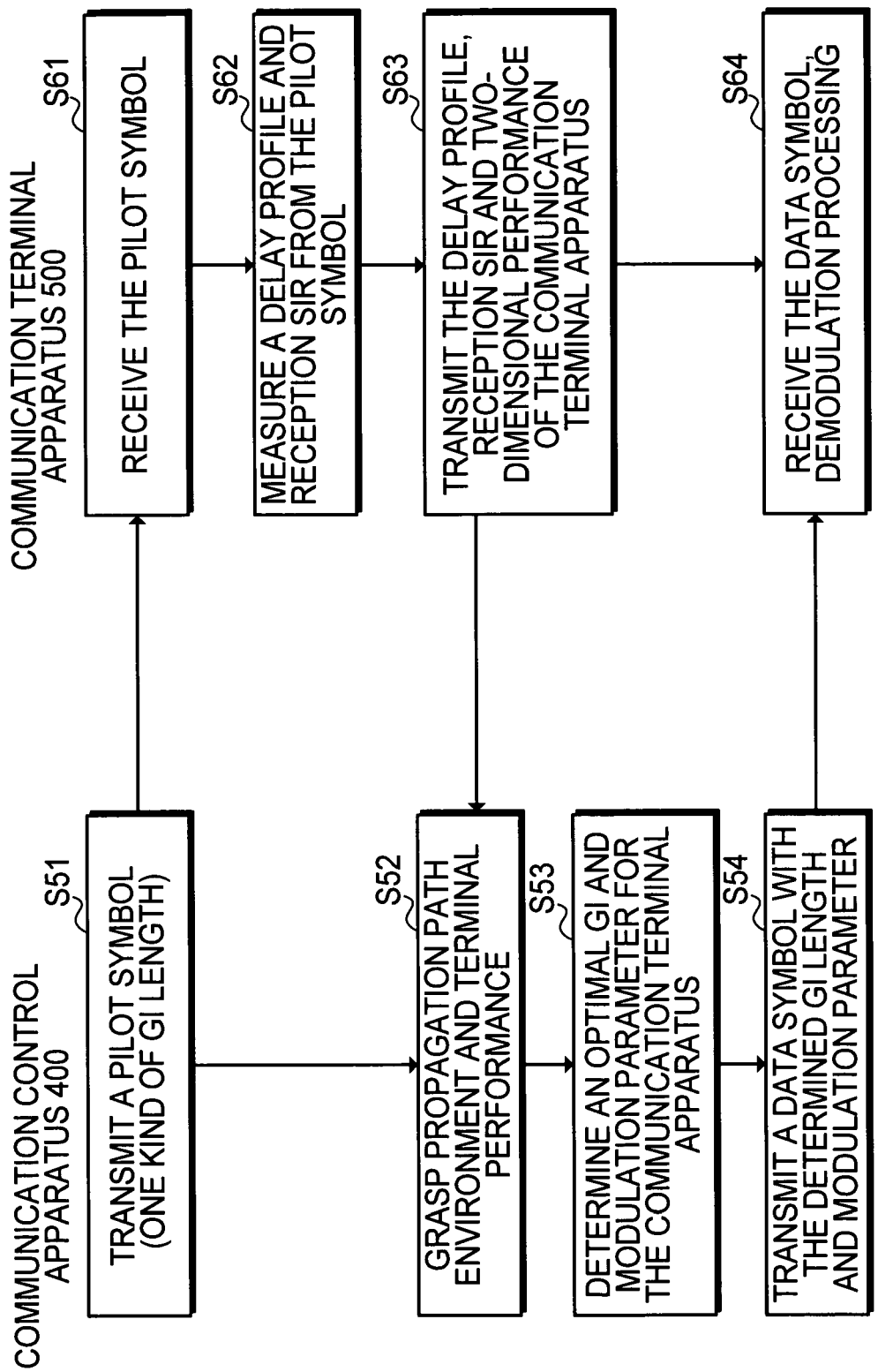
FIG. 8 is a diagram showing an example of processing of first communications associated with adjustments of GI length and modulation parameter in the wireless communication system of the second embodiment.

The operation of this embodiment will be described next. FIG. 8 is a diagram showing an example of processing of first communications associated with adjustments of GI length and modulation parameter in the wireless communication system of this embodiment.

S51 and S61 are respectively the same as S11 and S21 in FIG. 2. The delay profile measuring section 220 measures a delay profile of the propagation path using the received pilot symbol, and the reception signal quality measuring section 560 measures the reception signal quality using the received pilot symbol (step S62). The terminal information transmitting section 540 transmits to the communication control apparatus 400 the terminal information including the measured delay profile and reception quality information, the delayed version tolerant performance information stored in the delayed version tolerant performance table 230, and the reception sensitivity performance information stored in the reception sensitivity performance table 570 (step S63). By this means, the communication terminal apparatus 500 notifies the communication control apparatus 400 of the received propagation path environment (delay profile and reception signal quality information) and the terminal performance (delayed version tolerant performance information and reception sensitivity performance information).

In the communication control apparatus 400, the terminal information receiving section 420 receives the terminal information, and notifies the GI length determining section 140 of the delay profile and delayed version tolerant performance information included in the terminal information, while notifying the modulation parameter selecting section 460 of the delay profile, reception quality information and reception sensitivity performance information included in the terminal information. Further, the terminal information receiving section 420 associates the delayed version tolerant performance information and reception sensitivity performance included in the terminal information with the terminal ID to write in the terminal performance storing section 430 (step S52). By this means, the communication control apparatus 400 grasps the propagation path environment and terminal performance.

The GI length determining section 140 determines an optimal (for example, the shortest) guard interval enabling reception in the communication terminal apparatus 500 from the delay profile and delayed version tolerant performance information, and the modulation parameter selecting section 460 searches the reception sensitivity performance information that is the two-dimensional table using the delay profile and reception quality information to select one from a plurality of modulation parameters (step S53). In selecting a modulation parameter, the modulation parameter selecting section 460 selects a modulation parameter specified by a point of intersection of a point where the reception SIR on the vertical axis of the two-dimensional table of the reception sensitivity performance information agrees with the reception signal quality, and another point where the variable by delay profile on the horizontal axis agrees with the delay profile. The data symbol transmitting section 450 modulates a data symbol with the selected modulation parameter, and transmits the data symbol with the GI of the determined length added thereto (step S54). In the communication terminal apparatus 500, the data symbol receiving section 550 receives the data symbol from the communication control apparatus 400, and performs the demodulation processing (step S64).

Figure 9:
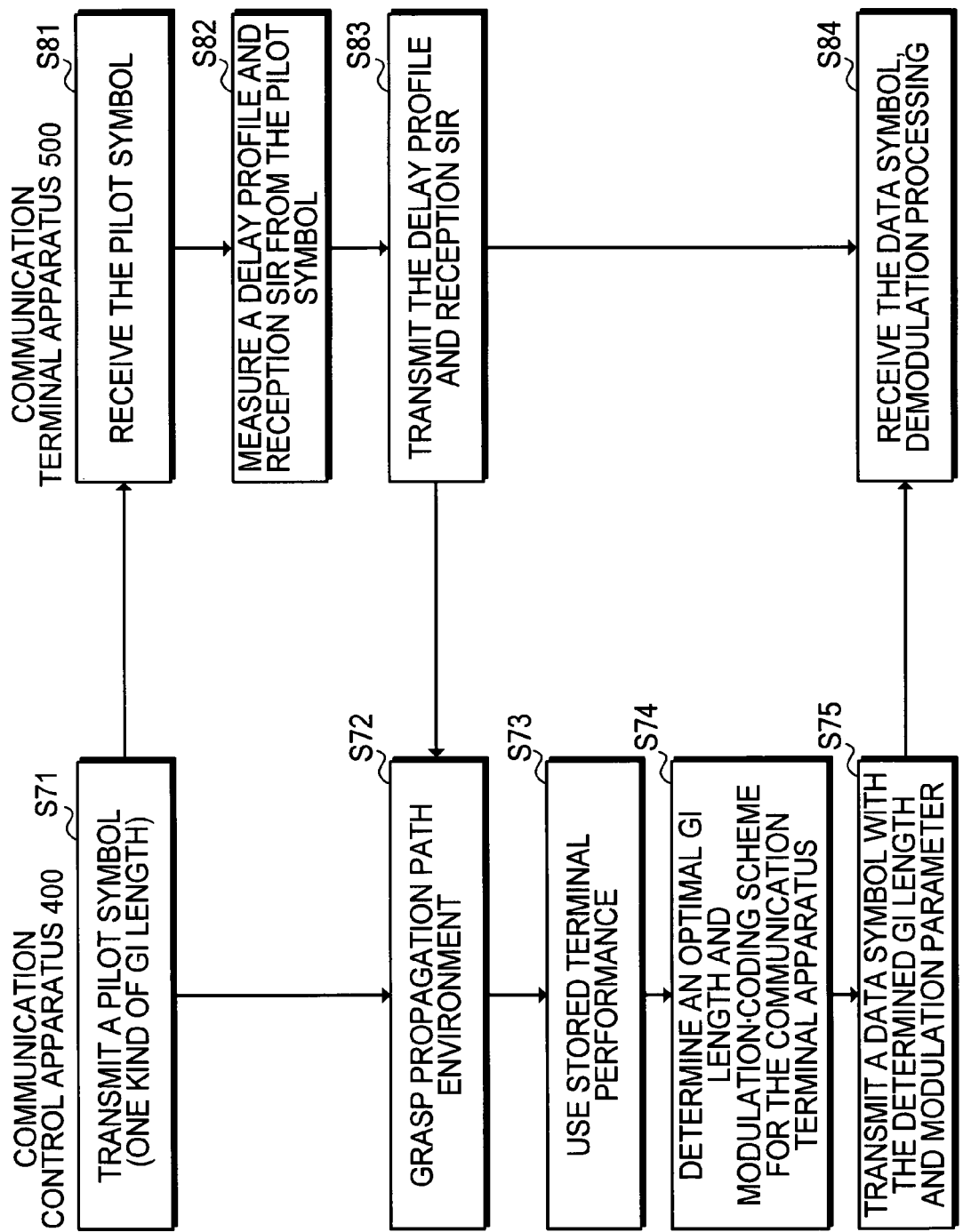
FIG. 9 is a diagram showing an example of processing of second communications associated with the adjustments of the GI length and modulation parameter in the wireless communication system of the second embodiment.
Figure 11:
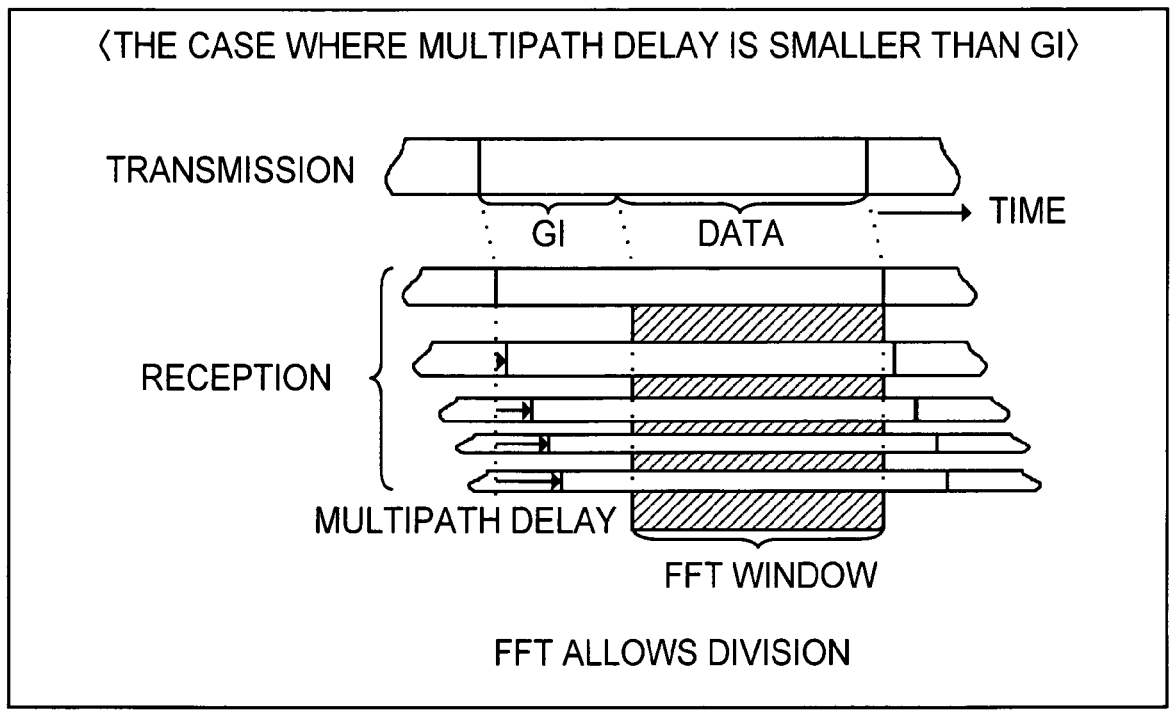
FIG. 11 is a diagram showing an example of the relationship between the delayed version and guard interval.
Figure 12:
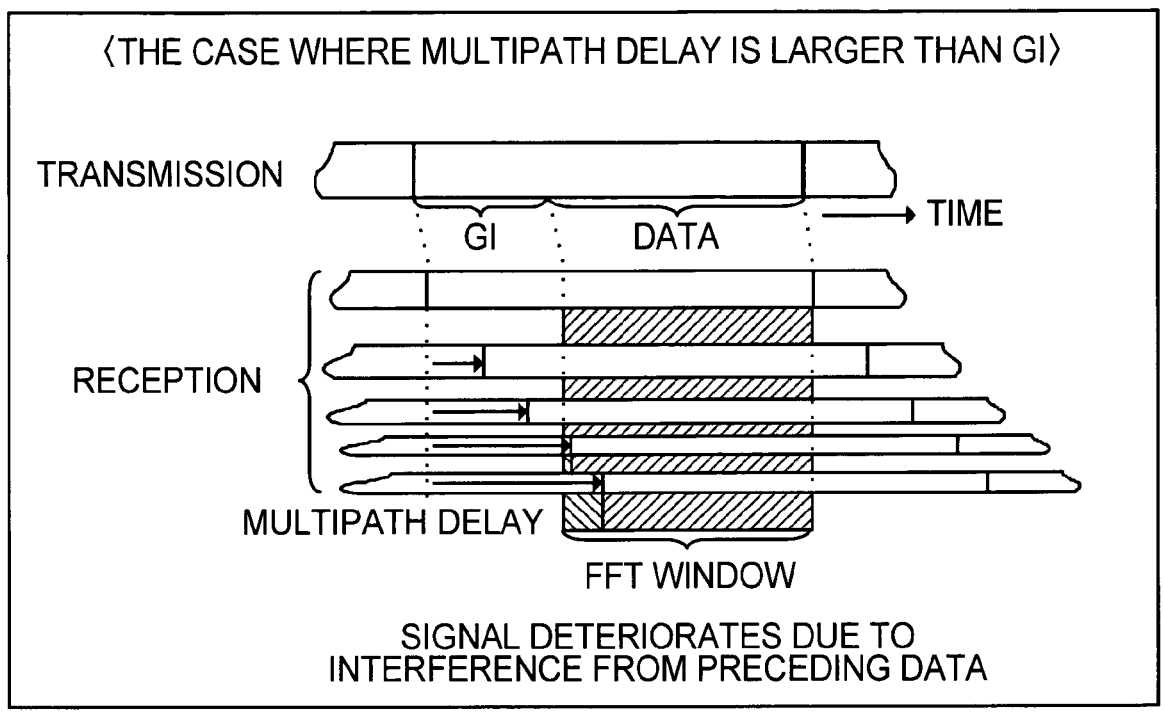
FIG. 12 is another diagram showing an example of the relationship between the delayed version and guard interval.
Figure 13:
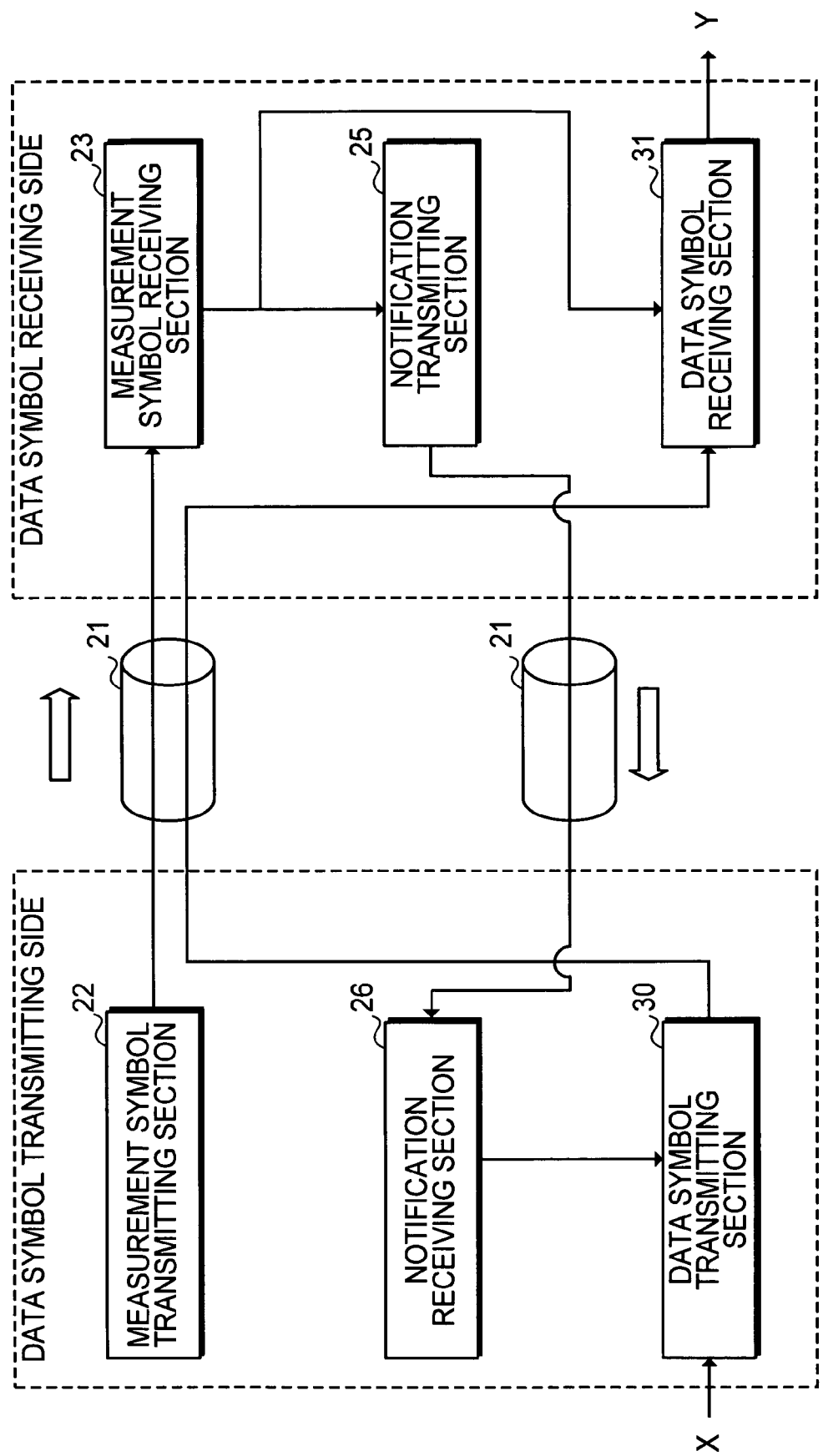
FIG. 13 is an example of a block diagram illustrating a configuration of an OFDM communication apparatus disclosed in Patent Document 1.

Thus, the communication terminal apparatus 500 notifies the delayed version tolerant performance information and reception sensitivity performance information of the apparatus 500 in the processing of first communications. In second and subsequent communications, since the performance is known for each terminal, the communication control apparatus 400 is capable of determining the optimal guard interval length from the propagation path information and terminal performance and selecting an optimal modulation parameter when being able to receive the propagation path information (delay profile and reception quality information) from the communication terminal apparatus 500. FIG. 9 is a diagram showing an example of processing of second communications associated with the adjustments of the GI length and modulation parameter in the wireless communication system of this embodiment.

S71 and S81 are respectively the same as S31 and S41 in FIG. 3, and S82 is the same as S62 in FIG. 8. The terminal information transmitting section 540 transmits the terminal information including the measured delay profile and reception quality information to the communication control apparatus 400 (step S83). By this means, the communication terminal apparatus 500 notifies the communication control apparatus 400 of the received propagation path environment (delay profile).

In the communication control apparatus 400, the terminal information receiving section 420 receives the delay profile and reception quality information as the terminal information, and notifies the delay profile to the GI length determining section 140, while notifying the delay profile and reception quality information to the modulation parameter selecting section 460 (step S72). The GI length determining section 140 reads the delayed version tolerant performance information from the terminal performance storing section 430 using the terminal ID for identifying the communication terminal apparatus 500, and the modulation parameter selecting section 460 reads the reception sensitivity performance information from the terminal performance storing section 430 using the terminal ID (step S73).

The GI length determining section 140 determines an optimal guard interval enabling reception in the communication terminal apparatus 500 from the delayed version tolerant performance information and delay profile, and the modulation parameter selecting section 460 searches the reception sensitivity performance that is the two-dimensional table based on the delay profile and reception quality information to select one from a plurality of modulation parameters (step S74). The data symbol transmitting section 450 modulates a data symbol with the selected modulation parameter, and transmits the data symbol with the GI of the determined length added thereto (step S75). In the communication terminal apparatus 500, the data symbol receiving section 550 receives the data symbol from the communication control apparatus 400, and performs the demodulation processing (step S84).

As described above, in the second embodiment, also in the system where the modulation coding rate is variable, by applying the transmitting method of this embodiment and notifying the reception sensitivity performance information (two-dimensional table), it is possible to determine and select the optimal guard interval length and modulation parameter. Further, the terminal performance information is required to be notified only once, and subsequently, transmission of the propagation path information and reception quality information enables settings of the guard interval length and modulation parameter.

Thus, according to this embodiment, it is possible to determine an optimal guard interval length and select a modulation parameter corresponding to the propagation path environment (delay conditions) and performance of the communication terminal apparatus. It is thereby possible to improve usage efficiency of the propagation path.

In addition, this embodiment uses the two-dimensional table with two kinds of information that are the delay information and signal quality information, but a modulation parameter can be selected in consideration of another factor. For example, the communication control apparatus 400 may input a Doppler frequency, and when the performance varies with the Doppler frequency or the like, use a three-dimensional table with the Doppler frequency added thereto. For example, when the Doppler frequency exceeds a predetermined threshold, the communication control apparatus 400 can decrement the level of reception signal quality by one to select a modulation parameter.

Further, the above-mentioned first or second embodiment describes the operation example where the terminal performance information (delayed version tolerant performance information and reception sensitivity performance information) to be stored in the terminal performance storing section 120 or 420 is received from the communication terminal apparatus 200 or 500 in first communications, and stored in the terminal performance storing section 120 or 420, respectively. However, the terminal performance information may be stored in the terminal performance storing section 120 or 420 at timing determined between the communication control apparatus 100 or 400 and the communication terminal apparatus 200 or 500, respectively. For example, the communication terminal apparatus (terminal) may notify the terminal performance information to the communication control apparatus (base station) in base station authentication where the terminal authenticates the base station. In the specification, the first communications indicate the case where the terminal performance information is not held in the communication control apparatus, and in many cases, correspond to communications performed after call setting. However, there may be the case where the terminal performance information is held in the communication terminal apparatus in call setting.

Furthermore, the operation is described where the GI determining section 140 and modulation parameter selecting section 460 are notified from the terminal information receiving sections 120 and 420 in first communications, but the operation may be applied where the sections read the terminal performance information from the terminal performance storing sections 130 and 430 to use.

Third Embodiment

The third embodiment is characterized in that when the delayed version tolerant performance can be varied by control on the communication terminal apparatus side, the communication terminal apparatus also notifies control information on the communication terminal apparatus side to the communication control apparatus, and the communication control apparatus thereby determines setting information.

To improve delayed version tolerant characteristics on the communication terminal apparatus side, an equalizer is effective, and there are various schemes as described in Non-patent Document 1. The many-circuit scale, computation power and time are generally required to support long delay. When an equalizer is comprised of digital circuitry, the circuit scale cannot be varied, but by reducing the required equalizing performance (maximum delay amount performance and deterioration suppression degree), it is possible to decrease the computation speed, or halt part of blocks to operate. Accordingly, in addition to the terminal performance, when the communication control apparatus can grasp the status where the communication terminal apparatus uses the terminal performance (delayed version tolerant performance), the communication control apparatus is capable of determining the GI length by also considering the operation of the communication terminal apparatus as well as the functions of each of the above-mentioned embodiments.

For example, the communication terminal apparatus is set for a class such as an operation class A, B, C or D corresponding to the degree of use of the terminal performance. FIG. 10 shows an example of the operation class, and further shows the relationship between the operation class, delayed version tolerant performance, and power consumption. The communication terminal apparatus adds the information of the operation class as the terminal information to notify the communication control apparatus. The communication control apparatus sets a guard interval length or modulation parameter in consideration of the operation class included in the terminal information. For example, the communication control apparatus multiples a value of the delayed version tolerant performance by a rate of usage status of the terminal performance indicated in the operation class, and thereby, reflects the operation class in the delayed version tolerant performance information. A numeric value of the percentage of the usage status of the terminal performance to full operation may be multiplied. The reception sensitivity performance information is in the same way.

By varying the operation class, the communication terminal apparatus varies the delayed version tolerant performance, and power consumption and processing time in the performance. For example, in the (finite) terminals such as cellular telephones used as an example of the communication terminal apparatus where the life of the battery is limited, when the battery reduces, it is sometimes required to decrease the operation class. Further, when the traffic held by the communication control apparatus (base station) is not congested, such a case may arise that decreasing the operation class to provide a guard interval with an allowance is better than setting the highest class for the shortest guard interval.

As described above, more excellent control is enabled by also using the information of the processing class of the terminal or the like. Further, as a more specific example, in the terminal where iteration processing of a turbo equalizer or the like is incorporated, the time and power consumption increases due to iterations. Therefore, iterations can be set as a parameter.

Thus, according to this embodiment, it is possible to determine a guard interval and select a modulation parameter in consideration of operating status of the terminal performance.

In addition, also in the system where the operation class is not present in (cannot be set on) the communication terminal apparatus (terminal), or the modulation parameter (modulation scheme·coding rate) cannot be varied, when the traffic is not congested, it is not necessary to dare to perform transmission with a short guard interval, and it is naturally desired to perform transmission by methods with better characteristics as possible corresponding to the transmission capacity required for the communication control apparatus (base station). In such a case, by considering the balance between avoidance of interference and transmission efficiency (transmission rate), the communication control apparatus determines a guard interval length and selects a modulation parameter based on the transmission capacity required for the communication control apparatus.

As described in each of the above-mentioned embodiments, by using the preferable embodiment of the invention, it is possible to determine an optimal guard interval for each terminal corresponding to the performance of the terminal, and achieve improvements in throughput of the communication control apparatus (base station). Further, it is possible to construct communication conditions adapted to the traffic status.

In addition, in each of the above-mentioned embodiments, descriptions are made while assuming the communication control apparatus as the base station and the communication terminal apparatus as the terminal station, but the invention is not limited thereto. The invention is applicable in such a case that a site that adds a guard interval to transmit a symbol is assumed to be the communication control apparatus, and another site that receives the symbol with the guard interval added thereto is assumed to be the communication terminal apparatus.

Further, FIGS. 1 and 6 show a single communication control apparatus and a single communication terminal apparatus, but there are cases that one communication control apparatus communicates with a plurality of communication terminal apparatuses, and in such cases, the communication control apparatus is capable of operating in the same way. Moreover, also in the case where a plurality of communication control apparatuses communicates with a plurality of communication terminal apparatuses, it is possible to apply the transmitting method of each of the above-mentioned embodiments. Furthermore, FIGS. 1 and 6 show the example where the communication control apparatuses 100 and 400 are provided with the pilot symbol transmitting section 110 and data symbol transmitting sections 150 and 450 as the transmitting section, and provided with the communication terminal apparatus performance receiving sections 120 and 420 as the receiving section, and further, the communication terminal apparatuses 200 and 500 are provided with the terminal information transmitting sections 240 and 540 as the transmitting section, and provided with the pilot symbol receiving sections 210 and 510 and data symbol receiving sections 250 and 550 as the receiving section, respectively. The sections are shown as part of each receiving section or each transmitting section by function, and included in the transmitting section or receiving section provided in the communication control apparatus or communication terminal apparatus. Moreover, each of the above-mentioned embodiments describes the case where the terminal information transmitting sections 240 and 540 transmit the terminal information including a plurality of kinds of information, but it is not intended to eliminate the case where the sections transmit each of the plurality of kinds of information at respective different timing.

The invention claimed is:

1. A communication control apparatus that adds a guard interval to transmit a symbol to a communication terminal apparatus, comprising:
   a receiving section that receives delayed version tolerant performance information indicating performance supported by the communication terminal apparatus on delayed versions from the communication terminal apparatus;

a guard interval length determining section that determines a length of the guard interval based on the delayed version tolerant performance information;

a transmitting section that transmits the symbol with the guard interval of the determined length added thereto to the communication terminal apparatus; and a modulation parameter selecting section that selects a modulation parameter using reception sensitivity performance information that associates each of a plurality of modulation parameters for specifying at least one of a modulation scheme and a coding rate with two factors which are reception quality information indicating quality of a received signal and delay information indicating delay conditions of the signal, wherein the receiving section further receives the reception quality information, the propagation path information indicating delay conditions of the propagation path, and the reception sensitivity performance information, the guard interval length determining section determines the length of the guard interval based on the delayed version tolerant performance information and the propagation path information, the modulation parameter selecting section selects the modulation parameter by searching the received reception sensitivity performance information based on the received reception quality information and propagation path information, and the transmitting section adds the guard interval of the determined length to the symbol modulated with the selected modulation parameter to transmit to the communication terminal apparatus.

2. The communication control apparatus according to claim 1, wherein the receiving section further receives propagation path information indicating delay conditions of a propagation path, and the guard interval length determining section determines the length of the guard interval based on the delayed version tolerant performance information and the propagation path information.

3. The communication control apparatus according to claim 2, further comprising:

a terminal performance storing section that stores the delayed version tolerant performance information, wherein the guard interval length determining section determines the guard interval length based on the delayed version tolerant performance information stored in the terminal performance storing section, and the propagation path information received in the receiving section.

4. The communication control apparatus according to claim 1, further comprising:

a terminal performance storing section that stores the delayed version tolerant performance information and the reception sensitivity performance information, wherein the guard interval length determining section determines the guard interval length based on the delayed version tolerant performance information stored in the terminal performance storing section, and the propagation path information received in the receiving section, and the modulation parameter selecting section selects the modulation parameter by searching the reception sensitivity performance information stored in the terminal performance storing section, based on the received reception quality information and propagation path information.

5. The communication control apparatus according to claim 2, wherein the receiving section receives a delay profile measured by the communication terminal apparatus as the propagation path information, and the guard interval length determining section determines the length of the guard interval for compensating delay conditions, based on the delayed version tolerant performance information and the delay profile.

6. The communication control apparatus according to claim 1, wherein the receiving section further receives mobile speed information of the communication terminal apparatus, and the modulation parameter selecting section selects the modulation parameter by searching the reception sensitivity performance information based on the received mobile speed information, in addition to the reception quality information and the propagation path information.

7. The communication control apparatus according to claim 1, wherein the receiving section further receives an operation class indicating status where the communication terminal apparatus uses the delayed version tolerant performance, and the modulation parameter selecting section selects the modulation parameter by searching the reception sensitivity performance information further based on the received operation class.

8. The communication control apparatus according to claim 2, wherein the receiving section further receives an operation class indicating status where the communication terminal apparatus uses the delayed version tolerant performance information, and the guard interval length determining section determines the guard interval length based on the delayed version tolerant performance information, the propagation path information and the received operation mode.

9. The communication control apparatus according to claim 7, wherein the operation class includes iterations of a turbo equalizer.

10. The communication control apparatus according to claim 2, wherein the guard interval length determining section determines the guard interval length based on a transmission capacity required for the communication control apparatus, in addition to the delayed version tolerant performance information and the propagation path information.

11. A wireless communication system where a communication control apparatus adds a guard interval to transmit a symbol to a communication terminal apparatus, wherein the communication terminal apparatus comprises a delayed version tolerant performance table that stores delayed version tolerant performance information indicating performance supported by the communication terminal apparatus on delayed versions, a terminal-side transmitting section that transmits the delayed version tolerant performance information, and a terminal-side receiving section that receives the symbol from the communication control apparatus, and the communication control apparatus comprises a control-side receiving section that receives the delayed version tolerant performance information from the communication terminal apparatus, a guard interval length determining section that determines a length of the guard interval based on the delayed version tolerant performance information, and a control-side transmitting section that transmits the symbol with the guard interval of the determined length added thereto to the communication terminal apparatus, a modulation parameter selecting section that selects a modulation parameter using reception sensitivity performance information that associates each of a plurality of modulation parameters for specifying at least one of a modulation scheme and a coding rate with two factors which are reception quality information indicating quality of a received signal and delay information indicating delay conditions of the signal, wherein the control-side receiving section further receives reception quality information, propagation path information indicating delay conditions of a propagation path, and reception sensitivity performance information, the guard interval length determining section determines the length of the guard interval based on the delayed version tolerant performance information and the propagation path information, the modulation parameter selecting section selects the modulation parameter by searching the received reception sensitivity performance information based on the received reception quality information and propagation path information, and the control-side transmitting section adds the guard interval of the determined length to the symbol modulated with the selected modulation parameter to transmit to the communication terminal apparatus.

12. A transmitting method for adding a guard interval to transmit a symbol to a communication terminal apparatus, comprising:

receiving delayed version tolerant performance information indicating performance supported by the communication terminal apparatus on delayed versions;

determining a length of the guard interval based on the delayed version tolerant performance information;

transmitting the symbol with the guard interval of the determined length added thereto to the communication terminal apparatus;

selecting a modulation parameter using reception sensitivity performance information that associates each of a plurality of modulation parameters for specifying at least one of a modulation scheme and a coding rate with two factors which are reception quality information indicating quality of a received signal and delay information indicating delay conditions of the signal;

receiving reception quality information, propagation path information indicating delay conditions of a propagation path, and reception sensitivity performance information;

determining the length of the guard interval based on the delayed version tolerant performance information and the propagation path information;

selecting the modulation parameter by searching the received reception sensitivity performance information based on the received reception quality information and propagation path information; and adding the guard interval of the determined length to the symbol modulated with the selected modulation parameter to transmit to the communication terminal apparatus.

13. A transmitting method where a communication control apparatus adds a guard interval to transmit a symbol to a communication terminal apparatus, wherein the communication terminal apparatus stores delayed version tolerant performance information indicating performance supported by the communication terminal apparatus on delayed versions in a delayed version tolerant performance table, transmits the delayed version tolerant performance information, and receives the symbol from the communication control apparatus, and the communication control apparatus receives the delayed version tolerant performance information from the communication terminal apparatus, determines a length of the guard interval based on the delayed version tolerant performance information, transmits the symbol with the guard interval of the determined length added thereto to the communication terminal apparatus;

selecting a modulation parameter using reception sensitivity performance information that associates each of a plurality of modulation parameters for specifying at least one of a modulation scheme and a coding rate with two factors which are reception quality information indicating quality of a received signal and delay information indicating delay conditions of the signal;

receiving reception quality information, propagation path information indicating delay conditions of a propagation path, and reception sensitivity performance information;

determining the length of the guard interval based on the delayed version tolerant performance information and the propagation path information;

selecting the modulation parameter by searching the received reception sensitivity performance information based on the received reception quality information and propagation path information; and adding the guard interval of the determined length to the symbol modulated with the selected modulation parameter to transmit to the communication terminal apparatus.

* * * * *